(12) United States Patent
Allanki et al.

(10) Patent No.: US 10,499,328 B2
(45) Date of Patent: Dec. 3, 2019

(54) SELF-ORGANIZING NETWORK (SON) WITH FAST INITIAL LINK SETUP (FILS)

(71) Applicant: Cable Television Laboratories, Inc., Louisville, CO (US)

(72) Inventors: Neeharika Allanki, Boulder, CO (US); Vikas Sarawat, Broomfield, CO (US); Vivek Ganti, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 354 days.

(21) Appl. No.: 15/092,532

(22) Filed: Apr. 6, 2016

(65) Prior Publication Data

US 2016/0295638 A1 Oct. 6, 2016

Related U.S. Application Data

(60) Provisional application No. 62/143,307, filed on Apr. 6, 2015.

(51) Int. Cl.
*H04W 48/20* (2009.01)
*H04W 84/12* (2009.01)

(52) U.S. Cl.
CPC ............ *H04W 48/20* (2013.01); *H04W 84/12* (2013.01)

(58) Field of Classification Search
CPC .............................. H04W 48/20; H04W 84/12
See application file for complete search history.

(56) References Cited

U.S. PATENT DOCUMENTS

| 9,622,218 B2* | 4/2017 | Lee ....................... H04W 72/04 |
| 2006/0029028 A1* | 2/2006 | Kim ...................... H04W 84/12 370/338 |
| 2013/0242748 A1* | 9/2013 | Mangalvedhe ....... H04W 24/02 370/241 |
| 2015/0049714 A1* | 2/2015 | Ghai ...................... H04W 76/10 370/329 |
| 2015/0382224 A1* | 12/2015 | Himayat ............... H04W 36/14 370/332 |
| 2016/0174265 A1* | 6/2016 | Tofighbakhsh ....... H04W 4/023 370/338 |
| 2016/0212695 A1* | 7/2016 | Lynch ................... H04W 48/08 |
| 2016/0294639 A1* | 10/2016 | Dribinski .............. H04W 24/02 |
| 2016/0295497 A1* | 10/2016 | Calcev .................... H04L 43/10 |
| 2016/0295628 A1* | 10/2016 | Allanki ................. H04W 12/06 |
| 2017/0164246 A1* | 6/2017 | Ganu ...................... H04W 8/14 |

* cited by examiner

*Primary Examiner* — Duc C Ho
(74) *Attorney, Agent, or Firm* — Great Lakes Intellectual Property, PLLC

(57) ABSTRACT

Ameliorating initial link setup in manage networks, self-organizing networks (SONs), systems, etc. of the type having capabilities sufficient to facilitate operations according to a common methodology is contemplated. The contemplated processes and systems may include ameliorating initial link setup when operating pursuant to the Fast Initial Link Setup (FILS) protocol defined in the Institute of Electrical and Electronics Engineers (IEEE) specification 802.11ai with use of a self-organizing network (SON) server to facilitate access point selection.

20 Claims, 4 Drawing Sheets

SELF-ORGANIZING NETWORK (SON) WITH FAST INITIAL LINK SETUP (FILS)

CROSS-REFERENCE TO RELATED APPLICATIONS

This application claims the benefit of U.S. provisional Application No. 62/143,307, filed Apr. 6, 2015, the disclosure and benefit of which is incorporated in its entirety by reference herein.

TECHNICAL FIELD

The present invention relates to limiting initial link setup in manage networks, self-organizing networks (SONs), systems, etc. of the type having capabilities sufficient to facilitate operations according to a common methodology, such as but not necessarily limited to ameliorating initial link setup when operating pursuant to the Fast Initial Link Setup (FILS) protocol defined in the Institute of Electrical and Electronics Engineers (IEEE) specification 802.11ai.

BACKGROUND

Fast Initial Link Setup (FILS) defined in the Institute of Electrical and Electronics Engineers (IEEE) specification 802.11ai, the disclosure of which is hereby incorporated by reference in its entirety herein, is an ongoing effort within the IEEE 802.11 series of specifications, commonly referred to as Wi-Fi, to reduce the initial link setup time between a client and an access point (access point) down to less than 100 ms. Wi-Fi offers the high-speed data but the initial link setup may take more than a few seconds, which is often enough time to cause unwanted interruptions in a voice or video call. The link setup time is the entire time it takes a client to establish a link or other association with an access point before it can start sending and receiving data. The link setup process may include four stages: access point discovery, network discovery, authentication and association and DHCP/IP address assignment. The link setup process can take as long as 5 seconds today and can be a problem, especially for the many Wi-Fi users today that are on the move.

A client driving in the city served by many Wi-Fi hotspots and on a voice call may travel rapidly through a coverage area of one access point to another with the amount of time spent in the blanket of each access point being quite low. In the few seconds the client spends in the coverage area of a single access point, the initial link setup would need to be completed quickly to take advantage of the available Wi-Fi connection and have a seamless call. (Of course, the client may be able to a cellular connection or link, however, providing seamless access without such a switch may be beneficial to avoid cellular services fees and to take advantage of Wi-Fi becoming ubiquitous.) Another use case (often termed to 'Tokyo Central Station' case) can arise when a large number of Wi-Fi users enter (and exit) a coverage area of an access point in an ESS in a short period of time. Both exemplary scenarios experience scanning delays as a majority of the delay in link setup.

Enhanced scanning mechanisms are being considered to address the corresponding delays in initial link setup. Two such mechanism are known as:

Filter List: The client, through its probe request frame explicitly identifies which access points it does not want to hear back from, such as through filter performed based on information collected from a previous scan. This ability to identify whether to stop receiving a probe response frame from any particular access point reduces scanning time and Wi-Fi pollution with the elimination of subsequent and unnecessary probe response frames being transmitted from the corresponding access point(s).

Comprehensive Probe Response: A comprehensive probe response (CPR) occurs when a master access point in a coverage area transmits a probe response instead of individual probe responses being transmitted from each access point in the coverage area. The single, comprehensive probe response decreases scanning time by limiting the number of transmitted probe responses Some access points may facilitate wireless signaling corresponding with that described in the CableLabs technical report for Wireless Wi-Fi entitled Wi-Fi Radio Resource Management (RRM)/Self Organizing Networks (SON) Technical Report (WR-TR-RRM-SON-V01-140926) and the CableLabs specification entitled Wi-Fi Provisioning Framework Specification (WR-SP-WR-SP-WiFi-MGMT-I06-160111), the disclosures of which are hereby incorporated by reference in their entireties herein. One goal of Wi-Fi Radio Resource Management (RRM)/Self Organizing Networks (SON) is to provide efficient operator managed and vendor interoperable Wi-Fi radio performance in the presence of large and dynamically changing numbers of access points and heavy user traffic.

One non-limiting aspect of the present invention contemplates leveraging a Wi-Fi SON server in a cloud/network that updates access point RF configurations based upon changes in local user traffic or networks topologies to reduce initial link setup time, such as to facilitate the FILS sought after with IEEE 802.11ai.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
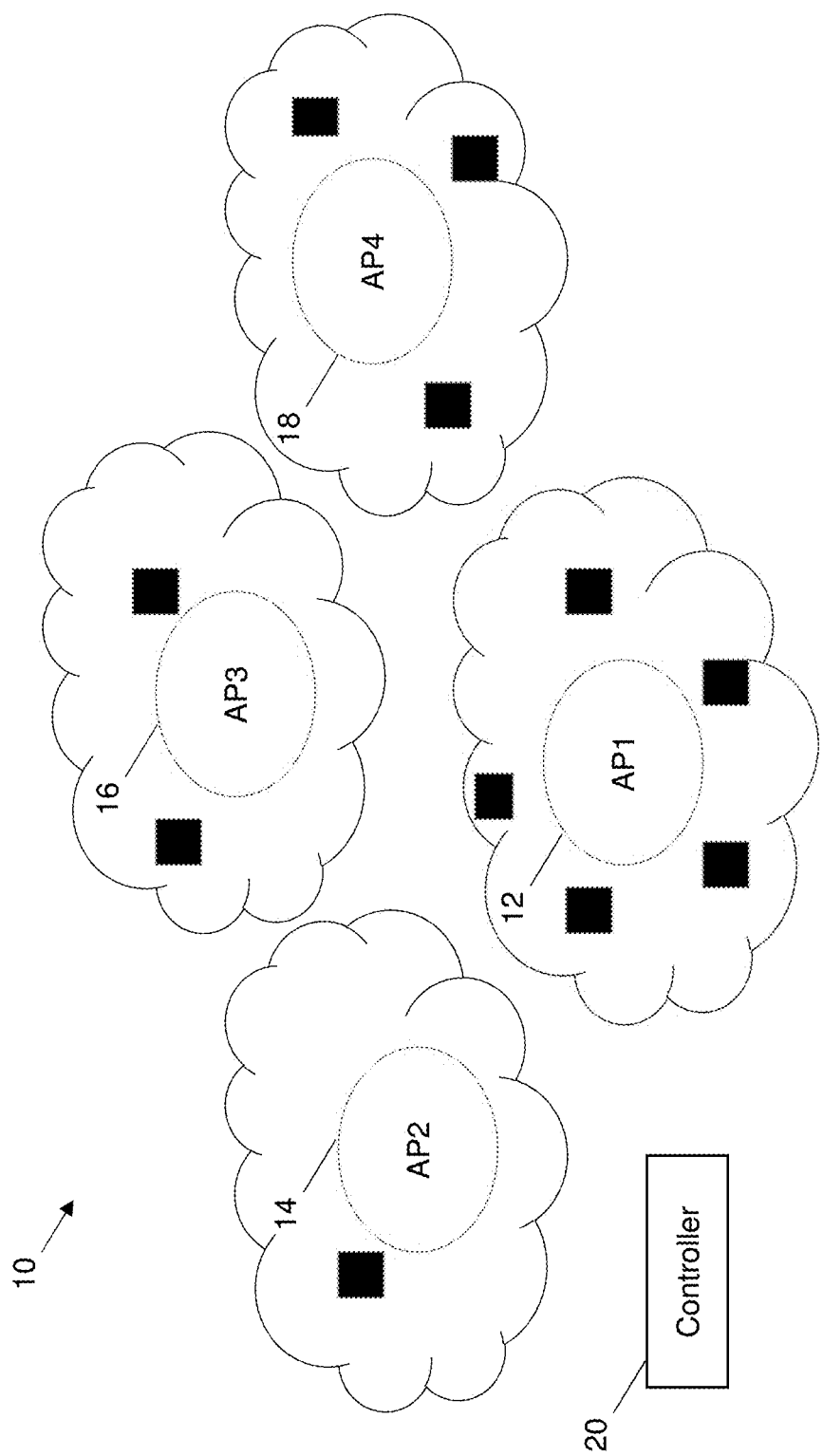
FIG. 1 illustrates an organized system in accordance with one non-limiting aspect of the present invention.

FIG. 1 illustrates an organized system 10 in accordance with one non-limiting aspect of the present invention. The system 10 depicts an exemplary environment having a plurality of wireless access points 12, 14, 16, 18 tasked with facilitating wireless services for a plurality of wireless clients (shown with boxes). A controller 20 may be configured in accordance with the present invention may facilitate managing one or more of the access points 12, 14, 16, 18 according to an initial link setup time reduction strategy herein. The controller 20 may be a standalone, network-based device, as shown, and/or integrated within one or more of the access points 12, 14, 16, 18 and configured to facilitate the operations contemplated herein. The access points 12, 14, 16, 18 may be Wi-Fi, cellular or other wireless capable devices having capabilities sufficient to provide wireless spectrum to authenticated clients or clients otherwise having completed a sign-on operation or similar handshake therewith. The access points 12, 14, 16, 18 may be connected to other wired/wireless networks and/or a backbone network having capabilities sufficient to facilitate long-haul transport of signaling associated with the one or more connected clients.

Wireless signaling between the access points 12, 14, 16, 18, clients and/or controller 20 may be compliant with the Institute of Electrical and Electronics Engineers (IEEE) 802.11 series of standards, the disclosures of which are hereby incorporated by reference in their entireties herein. The attendant wireless signaling may operate according to Part 11: Wireless LAN Medium Access Control (MAC) and Physical Layer (PHY) Specifications, Amendment 1: Radio Resource Measurement of Wireless LANs (IEEE 802.11k) and/or Amendment 9: Interworking with External Networks (Hotspot 2.0, IEEE 802.11u). The wireless signaling may also correspond with cellular standards, such as Long-Term Evolution (LTE) based on the Global System for Mobile Communications (GSM)/Enhanced Data rates for GSM Evolution (EDGE) and Universal Mobile Telecommunications System (UMTS)/High Speed Packet Access (HSPA) network technologies developed by the 3rd Generation Partnership Project (3GPP) as specified in its Release 8 and 9 document series and/or TS 36.201, 36.300, 36.304, 36.306, 36.321, 36.322, 36.323, 36.331, 36.401, 36.306 and 36.902 (self-organizing Network (SON)), the disclosures of which are hereby incorporated by reference in their entireties herein. Of course, the access points 12, 14, 16, 18 and the clients may optionally be considered as Internet of Things (IoT) devices and capable of Time Division Multiple Access (TDMA), Orthogonal Frequency Division Multiplexing (OFDM), Orthogonal Frequency Division Multiple Access (OFDMA), Single Carrier Frequency Division Multiple Access (SC-FDMA), Data Over Cable Service Interface Specifications (DOCSIS) 3.x, Long Term Evolution (LTE), LTE-Advanced (LTE-A), Wi-Max, Wi-Fi, Digital Video Broadcasting-Terrestrial (DVB-T), Digital Video Broadcasting-Handheld (DVB-H), Zigbee, ZWave etc., the disclosures of which are hereby incorporated by reference in their entireties.

A wireless signaling range of each access point 12, 14, 16, 18 is generically illustrated for exemplary purposes as the associated wireless signaling range may vary depending on signal strength, environmental obstructions, antenna configuration, etc. The wireless signaling range of each access point 12, 14, 16, 18 may overlap with one or more of the other access points 12, 14, 16, 18 and/or clients connected to one access point 12 may be within wireless signaling range of one or more of the other access points 14, 16, 18. The access points 12, 14, 16, 18 and the clients may connect or communicate with one or more of the access points 12, 14, 16, 18 as a function of various messages exchange therebetween. A client within signaling range of multiple access points 12, 14, 16, 18 may decide which one of the multiple access points 12, 14, 16, 18 to connect with as a function of advertisement messages transmitted from the corresponding access point 12, 14, 16, 18. IEEE 802.11u, for example, allows a client to query an access point 12, 14, 16, 18 for information like a name of the associated access point operator, capabilities of the associated wireless network, emergency alert information, geo-spatial and civic locations of the access point, potential roaming partners, etc. using Access Network Query Protocol (ANQP) protocol. The client may use this information to select one of the access points 12, 14, 16, 18 and thereafter negotiate with the selected access point for use of its wireless spectrum. The access points 12, 14, 16, 18 may accept or deny access requests depending on roaming agreements, subscriptions and any number of other influences.

IEEE 802.11k, section 5, describes additional measurements that may be utilized in accordance with the present invention to facilitate selecting and assessing performance of various access points 12, 14, 16, 18 as a function of a radio resource measurement (RRM). The RRM may include the following measurements: beacon, frame, channel load, noise histogram, STA statistics, location configuration information (LCI), neighbor report, link measurement and transmit stream/category measurement. IEEE 802.11k defines each measurement as follows:

Beacon: The Beacon request/report pair enables a STA to request from another STA a list of access points it can receive on a specified channel or channels. This measurement may be done by active mode (like active scan), passive mode (like passive scan), or beacon table modes. If the measurement request is accepted and is in passive mode, a duration timer is set and the measuring STA monitors the requested channel, measures beacon, probe response, and measurement pilot power levels (RCPI), and logs all beacons, probe responses, and measurement pilots received within the measurement duration. If the measurement request is in active mode, the measuring STA sends a probe request on the requested channel at the beginning of the measurement duration, then monitors the requested channel, measures beacon, probe response, and measurement pilot power levels (RCPI), and logs all beacons, probe responses, and measurement pilots received within the measurement duration. If the request is beacon table mode, then the measuring STA returns a Beacon Report containing the current contents of any stored beacon information for any channel with the requested SSID and BSSID without performing additional measurements.

Measurement Pilot: The Measurement Pilot frame is a compact Action frame transmitted periodically by an access point at a small interval relative to a Beacon Interval. The Measurement Pilot frame provides a subset of the information provided in a Beacon frame, is smaller than a Beacon, and is transmitted more often than a Beacon. The purpose of the Measurement Pilot frame is to assist a STA with scanning.

Frame: The frame request/report pair returns a picture of all the channel traffic and a count of all the frames received at the measuring STA. For each unique Transmitter Address, the STA reports the Transmitter Address, number of frames received from this transmitter, average power level (RCPI) for these frames, and BSSID of the transmitter.

Channel load: The channel load request/report pair returns the channel utilization measurement as observed by the measuring STA.

Noise histogram: The noise histogram request/report pair returns a power histogram measurement of non-IEEE 802.11 noise power by sampling the channel when virtual carrier sense indicates idle and the STA is neither transmitting nor receiving a frame.

STA statistics: The STA statistics request/report pair returns groups of values for STA counters and for BSS Average Access Delay. The STA counter group values include: transmitted fragment counts, multicast transmitted frame counts, failed counts, retry counts, multiple retry counts, frame duplicate counts, Request to Send (RTS) success counts, RTS failure counts, Acknowledgement (ACK) failure counts, received fragment counts, multicast received frame counts, FCS error counts, and transmitted frame counts. BSS Average Access Delay group values include: access point average access delay, average access delay for each access category, associated STA count, and channel utilization Location: The Location request/report pair returns a requested location in terms of latitude, longitude, and altitude. It includes types of altitude such as floors and permits various reporting resolutions. The requested location may be the location of the requestor (e.g., Where am I?) or the location of the reporting STA (e.g., Where are you?)

Measurement pause: The measurement pause request is defined, but no report comes back from this request. The measurement pause permits the inclusion of a quantified delay between the execution of individual measurements that are provided in a series within a measurement request frame. The measurement pause used as the last measurement in a frame provides control of the measurement period when measurement request frames are to be repeated.

Neighbor report: The neighbor report request is sent to an access point, which returns a neighbor report containing information about known neighbor access points that are candidates for a service set transition. Neighbor reports contain information from the table dot11RRMNeighborReportTable in the MIB concerning neighbor access points. This request/report pair enables a STA to gain information about the neighbors of the associated access point to be used as potential roaming candidates.

Link measurement: The link measurement request/report exchange provides measurements of the RF characteristics of a STA to STA link. This measurement indicates the instantaneous quality of a link.

Transmit stream/category measurement: The Transmit Stream/Category measurement is a request/report pair that enables a QoS STA to inquire of a peer QoS STA the condition of an ongoing traffic stream link between them. The Transmit Stream/Category Measurement Report provides the transmit-side performance metrics for the measured traffic stream. Trigger conditions included in the Transmit Stream/Category Measurement Request may initiate triggered Transmit Stream/Category Measurement Reports upon detection of the trigger condition.

Figure 2:
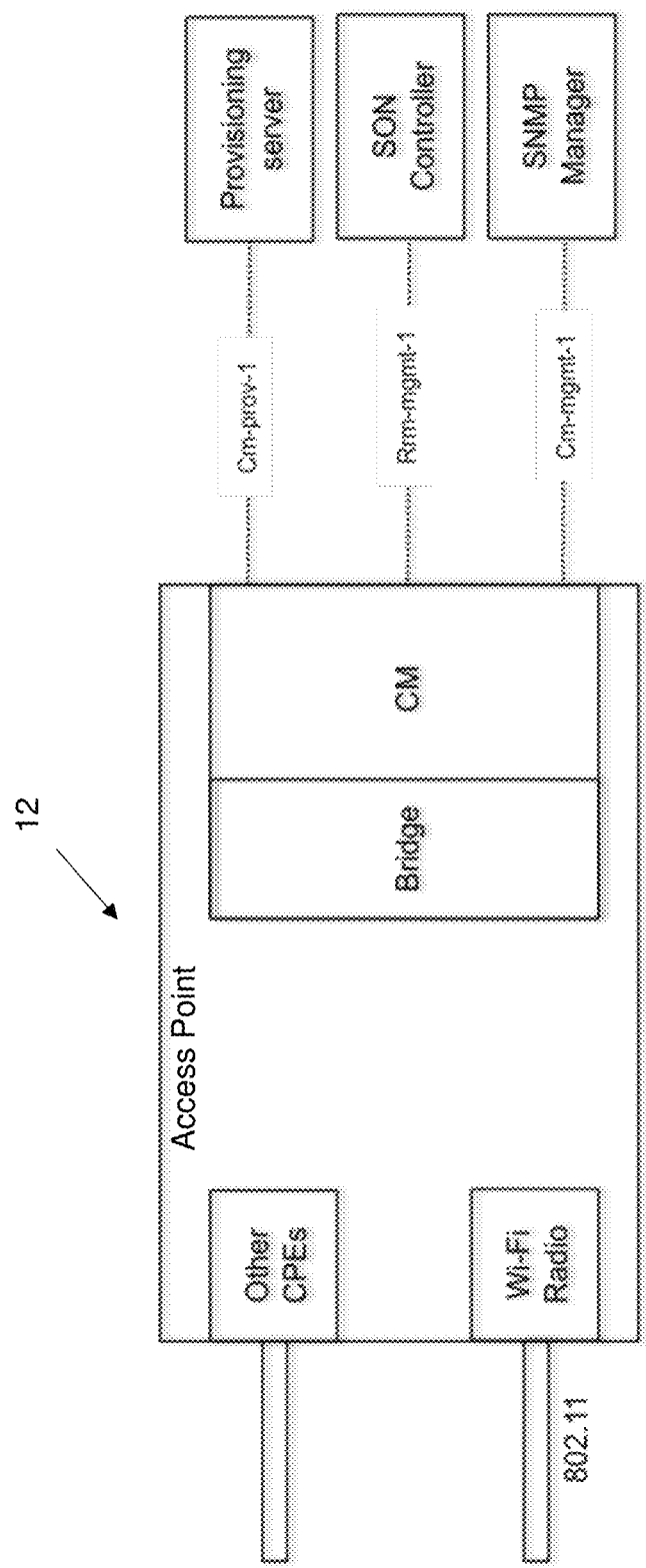
FIG. 2 illustrates an access point in accordance with one non-limiting aspect of the present invention.

FIG. 2 illustrates an access point 12 in accordance with one non-limiting aspect of the present invention. The access point 12 may include interfaces for exchanging signaling with a backbone or long-haul network over a connection and for exchanging wireless signals with clients within a corresponding signaling range. The access points and clients may optionally be configured to facilitate Multiple-Input Multiple-Output (MIMO) communications, such as that associated with U.S. patent application Ser. Nos. 14/181,640, 14/181,641, 14/181,643 and 14/181,645, the disclosures of which are hereby incorporated by reference in their entireties herein. The access point 12 may include a controller having a processor and a computer-readable medium with a plurality of non-transitory instructions operable to facilitate controlling the access point 12 to facilitate the load-balancing management contemplated herein. The access point 12 may be considered as a gateway, a cable modem, a router, a eNodeB be, a set-top box (STB), a phone or virtually any other device having capabilities consistent with the operations associated with the present invention (access points may also operate as clients and clients may also act as access points). The access point 12 is shown to include the wireline interface for exemplary purposes and as the wireline interface may be replaced with a wireless interface or eliminated.

The access point in an example of Wi-Fi Management on a device within the context of the Wi-Fi GW management interfaces specified within the noted Wi-Fi Provisioning Framework Specification (WR-SP-WiFi-MGMT-I06-160111), which for exemplary purpose is described with respect to a router having a cable modem (CM). The CM may be configured to support Wi-Fi as part of its LAN facing CPE interfaces and/or according to the Wi-Fi interfaces. The data elements provided by the object model defined in this specification can be provisioned, configured and monitored via the listed management interfaces. A Cm-prov-1 interface provides DHCP and FTP to the CM for provisioning and configuration at initialization where a configuration file can provide the attributes to initialize and configure the Wi-Fi interfaces. A Cm-mgmt-1 interface corresponds to the management interface for operational CMs where Wi-Fi interface attributes and parameters can be monitored and updated. A Rrm-mgmt-1 interface allows the controller 20 (or SON controller) to read or set parameters in the Wi-Fi GW that are related to the Wi-Fi RRM.

The controller 20 may be configured to ensure the best network performance to the user by addressing first order changes in the network environment. The controller 20 may also be automated so that operational burden is reduced using a few radio interface management parameters that can be updated when the SON server detects:
  Changes in network topology, for example the addition or removal of an operator access point
  Changes in the local environment, for example when operator access points see other Wi-Fi networks emerge or disappear
  Changes in interference conditions
  Changes in traffic patterns that effect the status of congestion hotspots With these detected capabilities, the controller 20 can update the RF management parameters on the access points under its control in order to improve throughput to subscriber devices. For example, when operator managed access points are added the transmit power of certain other operator access points may be lowered to reduce interference. As another example, the carrier sense threshold of certain access points may be adjusted based on changes in interference conditions. The controller 20 may not attempt to response to localized actions by clients of access points that need to be dealt with in msecs by a local access point. Rather, the controller 20 takes a network wide view of first order conditions that can be responded to periodically to improve overall network performance in the longer term.

Typical operational use of the controller 20 can be to poll for relevant information from the network access points over a time span of several days or a week. When the total set of information is available from a collation of access points for a given area of interest, the SON server may update the RF parameters for specific access points. Therefore, any given access point may need to provide information to the SON server only once a week, and see configuration updates only occasionally. This approach helps reduce the overhead of Wi-Fi SON functions. It also reduces the operational staff hours required to manage the network since the SON server management functions of the access points are automated.

Studies, prototype tests, and a 30,000 access point operational Wi-Fi SON managed network in Asia all show substantial increases in throughput (50% or more) using this SON concept of operations.

A component for SON operations may be support for standardized and open interfaces between the controller 20 the access points. The algorithms used for the controller 20 to adjust the access point RF parameters, however, may remain vendor or operator proprietary in order to encourage continued innovation.

Figure 3:
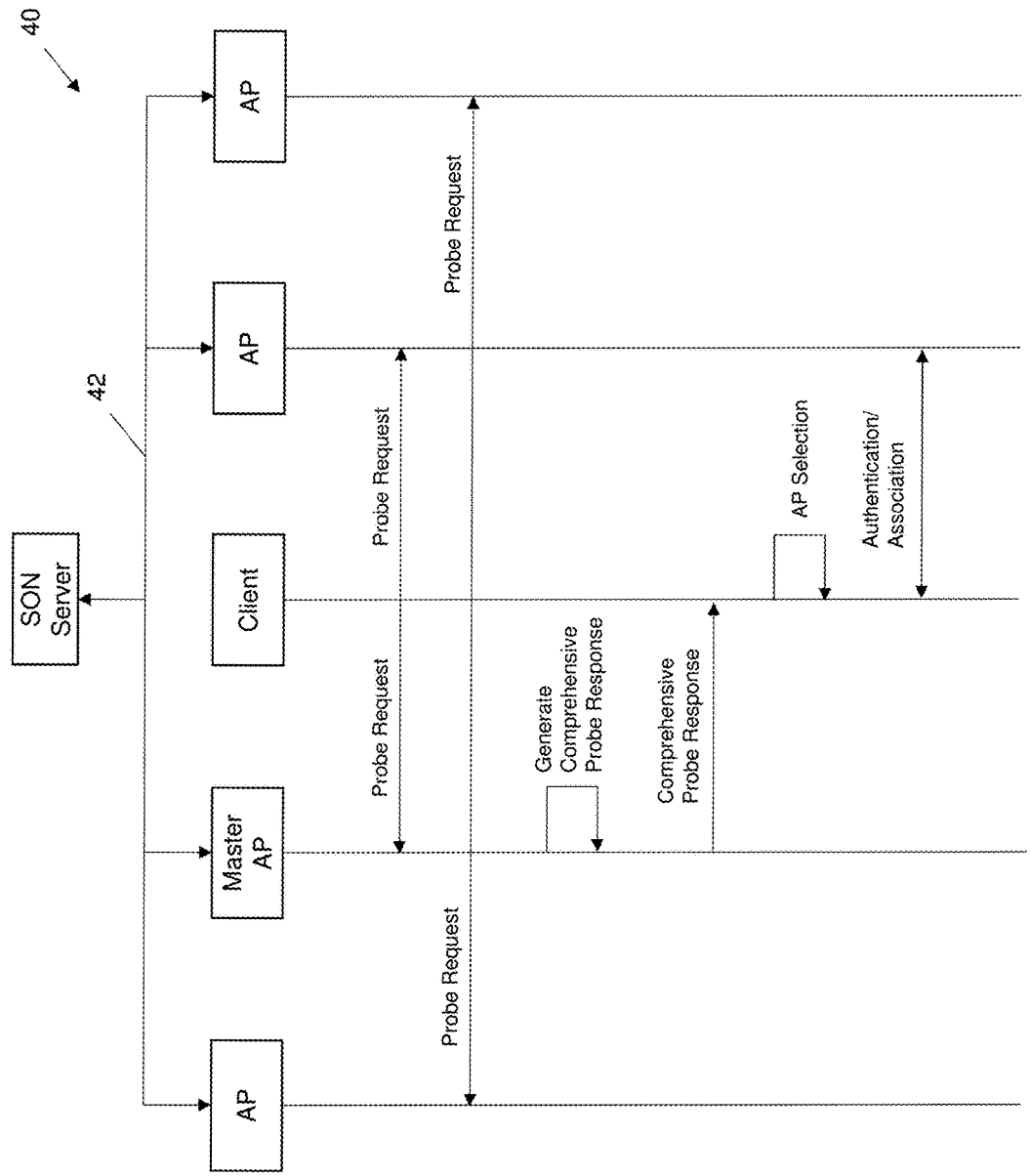
FIG. 3 illustrates a messaging diagram for ameliorating initial link setup in accordance with one non-limiting aspect of the present invention.

WBA Carrier Guidelines or Carrier Wi-Fi LAN (CW-LAN) may be defined as the carrier operated public Wi-Fi network, which may be different from the consumer and enterprise networks, meaning operators may have the means to manage radio resources, including the ability to, but not limited to, manage the following list of parameters below:

Transmit power
MCS rates
MIMO and MU-MIMO configurations
Beam forming configurations
Channel bandwidth
Maximum throughput per device
Carrier sense thresholds
Multi Band configuration and steering of devices, which can include dynamic traffic load sharing across bands
Subscriber and service-driven dynamic load balancing among access points, bands and channels
Channel assignments
Interference avoidance and mitigation for higher density deployments
The CWLAN will support the operator's ability to collect and monitor the KPIs listed below. (Note that KPI value ranges may need to be targeted to certain services):
Received signal strength from devices
Noise and interference levels
Packet error rates and packet loss rates
Throughput of uplink and downlink per device
Device location
Load threshold indicators
Channel utilization
Band utilization
Rogue access point detection
Neighbor access point detection
Delays, latencies and jitter for traffic uplink and downlink FIG. 3 illustrates a messaging diagram 40 for ameliorating initial link setup in accordance with one non-limiting aspect of the present invention. The diagram 40 is described with respect to a SON server, such as but not necessary limited to the above-described controller 20, facilitating SON-based networking sufficient to enable one or more clients to wirelessly communicate with a plurality of access points selected for inclusion within a corresponding SON. The SON server may communicate over a communication medium 42 with any number of access points to facilitate exchanging messages, data, metrics and other values. The exchanged information may be utilized to select the illustrated plurality of access points to form a particular SON, e.g., the four illustrated access points may have been selected from a greater number of access points to illustrate the exemplary SON. Once the access points comprising the SON are determined, the contemplated process for ameliorating initial link setup may be instigated upon a client transmitting a probe request. A single probe request may be broadcasted or multicasted to each of the access points within a wireless vicinity and/or multiple probe request may be unicasted or individually transmitted to each of access points.

Prior to or after the probe request is received at one or more of the access points, the master access point may generate a comprehensive probe response having access point selection information or other data associated with the access point. The access point selection information may indicate capacity, capabilities, states, affiliations, RRM data and/or other parameters useful to the client in selecting an access point for association, i.e., selecting the access point for initial link setup. One non-limiting aspect of the present invention contemplates ameliorating the time taken for selecting the initial link setup by facilitating generation of the comprehensive probe response according to determinations, information or other processes associated with the SON server. The SON server, as described above, may be positioned to assess and/or control any number of operational characteristics parameters and capabilities of access points, such as to dynamically coordinate the capabilities of the various access points to support the client. The use of the SON server to define the comprehensive probe response may be beneficial over the access points doing so as the access points may lack visibility and capabilities to control or monitor the other access points included in the SON, particularly when the configuration of the SON is dynamically managed.

The SON server, for example, may specify in the access point selection information advertisements, lists or other rankings for the access points to be used by the client in making access point selection decisions. The SON server can adjust the access point selection information to exclude undesirable access points, to recommend certain access points over other access points and to otherwise force the client to attempt link setup in a particular sequence intended to limit the time taken to establish a link and/or to ameliorate the amount of messages being exchanged between the client and access points (e.g., Wi-Fi pollution). A comprehensive probe response having the access point selection information may be transmitted from the master access point to the client to facilitate subsequent selection of the access point desired for initial link setup. The comprehensive probe response may be transmitted in accordance with IEEE 802.11ai, the Wi-Fi Provisioning Framework Specification or other suitable protocol. The client may undertake an access point selection process according to the information included in the comprehensive probe response. An authentication/association process may then be undertaken with the selected access point to attempt communications therewith, which may characterize instantiation of the initial link setup.

Figure 4:
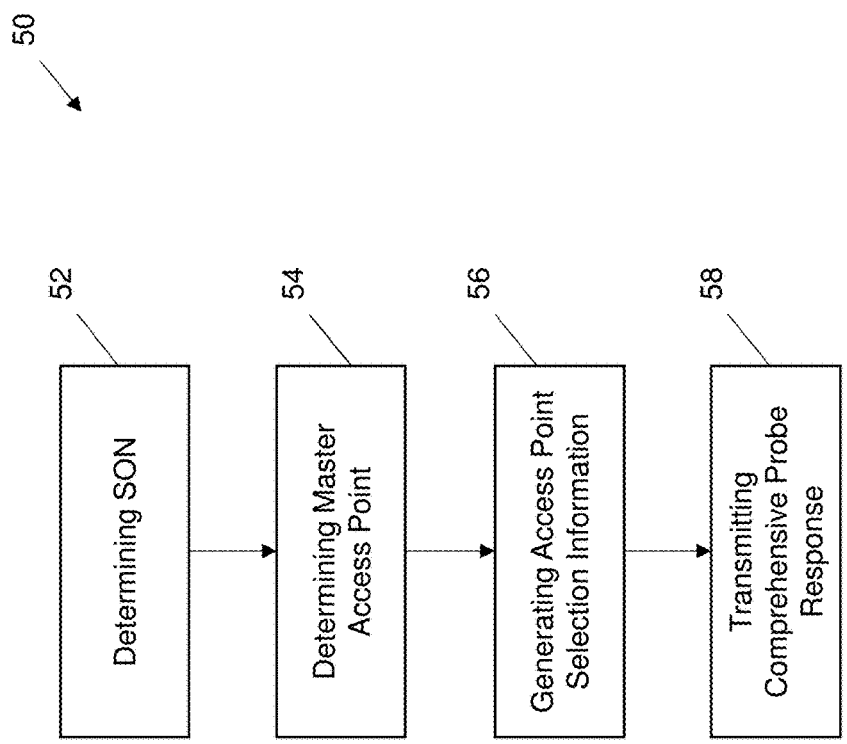
FIG. 4 illustrates a flowchart for a method of ameliorating initial link setup in accordance with one non-limiting aspect of the present invention.

FIG. 4 illustrates a diagram 50 for a method of ameliorating initial link setup in accordance with one non-limiting aspect of the present invention. The access points, client and/or SON controller may include a computer-readable medium having a plurality of non-transitory instructions suitable for execution with a processor associated therewith to facilitate one or more of the contemplated operations. The method is predominately described for exemplary non-limiting purposes as ameliorating initial link setup by leveraging the visibility and other capabilities of the SON server to facilitate recommending access points whereby the client is able to limit the number of link setup attempts being made by and/or the amount of data (bandwidth) consumed in facilitating the selection. The contemplated leveraging of a comprehensive probe response with the SON-based networking configuration is believed to be particularly beneficial in enabling access points and their attendant networking capability to be dynamically managed to achieve maximum throughput, quality of service (QOS) and/or other desired operational capabilities, which may not be available to static or non-dynamically controlled networks, e.g., networks having a pre-defined neighborhood or set of access points.

Block 52 relates to determining a SON in communication with a client desiring to establish a link with an access point. The SON may be comprised of a plurality of access points selected from a greater number of access points prior to arrival of the client and/or in response to messages or other activities of the client. One non-limiting aspect of the present invention contemplates the SON being determined in advance according to data collected over time for the greater number of access points whereby the SON server divides or otherwise partitions the greater number of access points into the plurality of access points forming each SON under its control. One non-limiting aspect of the present invention also contemplates the described SON being self-defining in so far as being comprised of the access points within the greater number of access points actually receiving a probe request from the client, e.g., the four access points of the greater number within wireless signaling range of the client. Of course, the present invention fully contemplates any number of processes and procedures being implemented to facilitate determining the access points comprising a SON, including dynamically adding and removing access points from a previously established SON.

Block 54 relates to selecting one of the plurality of access points comprising the SON to act as a master access point. The master access point may be selected as the access point having the least loaded, the greatest available throughput, the greatest signaling strength and/or or according to any number of other operating conditions. One non-limiting aspect of the present invention contemplates selecting the master access point on a client-by-client basis such that the processing demands and attendant operations for the contemplated master access point can be shared equally amongst the plurality of access points comprising the SON and/or in proportion to the capabilities of each access point, e.g., each access point may operate as a master access point for an equal proportion amount of time or process depending on their relative capabilities and/or based on historical performance assessed with the SON server. Block 56 relates to generating access point selection information for transmission to the master access point for purposes of facilitating client selection of one of the plurality of access points comprising the SON. The access point selection information may optionally be generated in response to the SON server receiving a confirmation message from one or more of the access points confirming receipt of a probe request from the client so as to facilitate making the recommendations proximate in time to the client request.

One non-limiting aspect of the present invention contemplates generating the access point selection information depending on a capacity registered with the SON server for each of the plurality of access points. The capacity may be measured in bandwidth, throughput, etc. to reflect whether the corresponding access point is operating within desired operation ranges. The SON server may assess the capacities to determine whether any of the plurality of access points can be characterized as an overloaded access point, e.g., one operating above its desired capacity threshold. The corresponding access point selection information may be correspondingly generated to advertise each of the plurality of access points as being available to the client other than each overloaded access point.

One non-limiting aspect of the present invention contemplates generating the access point selection information depending on a capability registered with the SON server for each of the plurality of access points and/or the client to comply with certain protocols, such as but not necessarily limited to determining whether any access points are characterizes as a n/ac-only access point (e.g., limited to IEEE 802.11n (2.4 Ghz or 5 Ghz) 802.11ac (2.4 Ghz) or whether the client is characterized as a b/g legacy client (limited to IEEE 802.11b/g or 2.4 Ghz). The corresponding access point selection information may be correspondingly generated to advertise each of the plurality of access points as being available to the client other than each n/ac-only access point when the b/g legacy client is determined and to advertise each of the plurality ofaccess points as being available to the client when the non-b/g legacy client is determined.

One non-limiting aspect of the present invention contemplates generating the access point selection information depending a state registered with the SON server for each of the plurality of access points for an upcoming time interval occurring proximate in time to the probe request, such as but not necessarily limited to determining whether one or more of the access points are characterized as an offline access point due to being powered down, being in low power mode and/or undergoing a software upgrade. The corresponding access point selection information may be correspondingly generated to advertise each of the plurality of access points as being available to the client for the association other than each offline access point.

One non-limiting aspect of the present invention contemplates generating the access point selection information depending an affiliation registered with the SON server for each of the plurality of access points and the client, such as based on an identity of a multiple system operator (MSO), service provider (SP) or other entity associated with a subscription or other entitlement to the operation thereof. The corresponding determination may include assessing based on the affiliations one or more of the plurality of access points to be characterized as a non-affiliated access point due to being non-affiliated with the affiliation of the client, e.g., associated with an operator lacking support (subscription, hardware, protocol, etc.) for the client. The corresponding access point selection information may be correspondingly generated to advertise each of the plurality of access points as being available to the client for the association other than each non-affiliated access point.

One non-limiting aspect of the present invention contemplates generating the access point selection information depending on a priority registered with the SON server for each of the plurality of access points based on RSSI, AP load, performance metrics representing a received signal strength indicator (RSSI), available throughput, RRM, etc. and thereafter establishing a priority ranking for each of the plurality of access points in order from highest to lowest priority. The corresponding access point selection information may be correspondingly generated to advertise each access point in order of the priority ranking such that the client selects the highest ranking access point for link setup if compatible.

Block 58 relates to the SON server instructing the master access point to transmit the comprehensive probe response having the access point selection information to the client. The client thereafter processes the access point selection information to select an access point for the initial link setup, which using the advantageous capabilities of the SON server, is contemplated to ameliorate scanning, messaging and other Wi-Fi pollution for the client and additional clients attempting to access the SON. Accordingly, the present invention proposes to better the process of sending comprehensive probe responses in conjunction with a SON server. The SON server has information/ knowledge on the network and its conditions which can be leveraged to relay to the 'master access point' to further increase the efficiency of comprehensive probe responses in an effort to make Wi-Fi a better/faster service as a whole and as a significant step ahead in making the link setup process more efficient.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium having a plurality of non-transitory instructions executable with a processor of a self-organizing network (SON) server to facilitate optimizing access point selection for a client, the non-transitory instructions being sufficient for:
   selecting a plurality of access points to form a SON within a wireless vicinity of the client;
   selecting one of the plurality of access points to operate as a master access point;
   instructing the master access point to transmit a comprehensive probe response to the client sufficient to facilitate selection of one of the plurality of access points for an association;
   instructing the master access point to transmit the comprehensive probe response to the client when any one of the plurality of access points receives a probe request from the client; and
   contemporaneously instructing another master access point selected from the plurality of access points to transmit another comprehensive probe response to another client in an area of interest common to the client such that the master access point and the another master access point are selected on a client-by-client basis.

2. The non-transitory computer-readable medium of claim 1 further comprising non-transitory instructions sufficient for transmitting access point selection information to the master access point for inclusion within the comprehensive probe response to facilitate the association.

3. The non-transitory computer-readable medium of claim 2 further comprising non-transitory instructions sufficient for:
   determining a capacity for each of the plurality of access points;
   determining based on the capacities one or more of the plurality of access points to be characterized as an overloaded access point; and
   advertising within the access point selection information each of the plurality of access points as being available to the client for the association other than each overloaded access point.

4. The non-transitory computer-readable medium of claim 2 further comprising non-transitory instructions sufficient for:
   determining a capability for each of the plurality of access points;
   determining based on the capabilities one or more of the plurality of access points to be characterized as a n/ac-only access point;
   determining the client to be characterized as one of a b/g legacy client and a non-b/g legacy client;
   advertising within the access point selection information each of the plurality of access points as being available to the client for the association other than each n/ac-only access point when the b/g legacy client is determined; and
   advertising within the access point selection information each of the plurality of access points as being available to the client for the association when the non-b/g legacy client is determined.

5. The non-transitory computer-readable medium of claim 2 further comprising non-transitory instructions sufficient for:
   determining a state for each of the plurality of access points for an upcoming time interval proximate in time to the association;
   determining based on the states one or more of the plurality of access points to be characterized as an offline access point due to being powered down, being in low power mode and/or undergoing a software upgrade; and
   advertising within the access point selection information each of the plurality of access points as being available to the client for the association other than each offline access point.

6. The non-transitory computer-readable medium of claim 2 further comprising non-transitory instructions sufficient for
   determining an affiliation for each of the plurality of access points and the client;
   determining based on the affiliations one or more of the plurality of access points to be characterized as a non-affiliated access point due to being non-affiliated with the affiliation of the client; and
   advertising within the access point selection information each of the plurality of access points as being available to the client for the association other than each non-affiliated access point.

7. The non-transitory computer-readable medium of claim 2 further comprising non-transitory instructions sufficient for:
   determining a priority for each of the plurality of access points;
   determining a priority ranking for each of the plurality of access points in order from highest to lowest priority based on the priorities; and
   advertising within the access point selection information the priority ranking.

8. The non-transitory computer-readable medium of claim 7 further comprising non-transitory instructions sufficient for determining the priorities based on performance metrics transmitted from each of the plurality of access points to the SON server, the performance metrics representing at least a received signal strength indicator (RSSI), an available throughput and a load on the corresponding access point.

9. The non-transitory computer-readable medium of claim 7 further comprising non-transitory instructions sufficient for determining the priorities based on Radio Resource Manager (RRM) data transmitted from each of the plurality of access points to the SON server.

10. The non-transitory computer-readable medium of claim 2 further comprising non-transitory instructions sufficient for:
   transmitting the access point selection information from the SON server to the master access point without transmitting the access point selection information to the other plurality of access points; and selecting the plurality of access points to form the SON as a function of data previously collected from the plurality of access points by the SON server, including selecting the plurality of access points to form the SON prior to arrival of the client in an area of interest serviced by the plurality of access points.

11. The non-transitory computer-readable medium of claim 1 further comprising non-transitory instructions sufficient for:
selecting the plurality of access points to form the SON from a greater plurality of access points within a vicinity of the client such that the plurality of access points includes each of the greater plurality of access points receiving a probe request from the client and excludes each of the greater plurality of access points failing to receive the probe request; and
instructing the master access point to transmit the comprehensive probe response to the client after selecting the plurality of access point to form the SON such that each of the plurality of access points receives the probe request from the client before the SON is formed.

12. The non-transitory computer-readable medium of claim 1 further comprising non-transitory instructions sufficient for instructing the master access point to transmit the comprehensive probe response after the SON receives a probe request confirmation from one of the plurality access point other than the master access point confirming receipt of the probe request.

13. The non-transitory computer-readable medium of claim 1 further comprising non-transitory instructions sufficient for selecting the plurality of access points forming the SON prior to any one of the plurality of access points receiving the probe request resulting in the comprehensive probe response being transmitted to the client.

14. The non-transitory computer-readable medium of claim 1 further comprising non-transitory instructions sufficient for limiting the plurality of access points selected to form the SON to access points receiving the probe request.

15. A self-organizing network (SON) comprising:
a plurality of access points configured to facilitate establishing a link with a client desiring access thereto, each of the plurality of access points being independently connected to a backbone or long-haul network to facilitate communication between the backbone or long-haul network and the client; and
a SON server in communication with the plurality of access points having a computer-readable medium with a plurality of non-transitory instructions executable with a processor thereon to facilitate:
i) selecting a portion of the plurality of access points to form a SON in an area of interest of the client, the portion including less than all of the plurality of access points in the area of interest capable of establishing the link;
ii) selecting one of a plurality of access points in the portion to operate as a master access point;
iii) instructing no more than the master access point to transmit a comprehensive probe response to the client, the comprehensive probe response being sufficient to facilitate selection of one of the portion for an initial link setup with the client;
iv) instructing the master access point to transmit the comprehensive probe response to the client when any one of the plurality of access points receives a probe request from the client; and
v) contemporaneously instructing another master access point selected from the plurality of access points to transmit another comprehensive probe response to another client in an area of interest common to the client such that the master access point and the another master access point are selected on a client-by-client basis.

16. The SON of claim 15 wherein the non-transitory instructions of the SON are sufficient to facilitate:
transmitting access point selection information needed for the client to establish the link to no more than the master access point for inclusion within the comprehensive probe response such that none of the other access points in the SON receive the access point selection information; and
selecting the portion of the plurality of access point to form the SON:
i) as a function of data previously collected from the plurality of access points by the SON server, including selecting the portion prior to arrival of the client in the area of interest; or
ii) to include each of the plurality of access points receiving a probe request from the client and to exclude each of the plurality of access points failing to receive the probe request.

17. A method for optimizing access point selection for a client comprising:
selecting a plurality of access points to form a self-organizing network (SON) within a wireless vicinity of the client;
selecting one of the plurality of access points to operate as a master access point;
instructing the master access point to transmit a comprehensive probe response to the client to facilitate selection of one of the plurality of access points for an association;
instructing the master access point to transmit the comprehensive probe response to the client when any one of the plurality of access points receives a probe request from the client; and
instructing another master access point selected from the plurality of access points to transmit another comprehensive probe response to another client in an area of interest common to the client such that the master access point and the another master access point are selected on a client-by-client basis.

18. The method of claim 17 further comprising instructing the master access point to transmit the comprehensive probe response after the SON receives a probe request confirmation from one of the plurality access point other than the master access point confirming receipt of the probe request.

19. The method of claim 17 further comprising selecting the plurality of access points forming the SON prior to any one of the plurality of access points receiving the probe request resulting in the comprehensive probe response being transmitted to the client.

20. The method of claim 17 further comprising limiting the plurality of access points selected to form the SON to access points receiving the probe request.

* * * * *